(12) United States Patent
Ashwin

(10) Patent No.: US 11,347,983 B2
(45) Date of Patent: May 31, 2022

(54) METHOD AND APPARATUS FOR SELECTING A WIRELESS READER ACTION AS A RESULT OF AN OUTPUT DATA RECEIVED FROM A WIRELESS IDENTIFICATION DEVICE

(71) Applicant: HIVE TECHNOLOGY, Dubai (AE)

(72) Inventor: Terrence Keith Ashwin, Fourways (ZA)

(73) Assignee: HIVE TECHNOLOGY, Dubai (AE)

( * ) Notice: Subject to any disclaimer, the term of this patent is extended or adjusted under 35 U.S.C. 154(b) by 0 days.

(21) Appl. No.: 15/577,801

(22) PCT Filed: May 29, 2015

(86) PCT No.: PCT/IB2015/054064
§ 371 (c)(1),
(2) Date: Nov. 29, 2017

(87) PCT Pub. No.: WO2016/193778
PCT Pub. Date: Dec. 8, 2016

(65) Prior Publication Data
US 2018/0157944 A1 Jun. 7, 2018

(51) Int. Cl.
*G06K 17/00* (2006.01)
*G06Q 10/08* (2012.01)
(Continued)

(52) U.S. Cl.
CPC ....... *G06K 17/0022* (2013.01); *G06K 19/045* (2013.01); *G06Q 10/08* (2013.01);
(Continued)

(58) Field of Classification Search
CPC .. G06K 17/0022; G06K 19/045; G06Q 10/08; G06Q 10/083; H04W 12/06; H04W 12/08; H04W 12/04
See application file for complete search history.

(56) References Cited

U.S. PATENT DOCUMENTS 5,825,006 A * 10/1998 Longacre, Jr. ... G06K 19/06037
235/472.01
5,900,613 A * 5/1999 Koziol ............... G06K 7/10851
235/462.15

(Continued)

*Primary Examiner* — Joseph H Feild
*Assistant Examiner* — Rufus C Point
(74) *Attorney, Agent, or Firm* — Mark M. Friedman

(57) ABSTRACT

A method and apparatus for selecting a wireless reader action comprising the steps of a wireless communication identification device which is a wireless identification device transmitting output data; the wireless reader thereafter receives the output data, wherein the output data comprises an instruction set how to process the output data; and the wireless reader processing the output data and performing a suitable action in compliance with said output data instructions. The wireless identification device comprises at least one of a unique data address and a unique variable encryption key, which is transmitted as part of the instruction set. Authentication of data and resulting permission to decrypt the wireless identification device output data is transmitted to at least one of an authentication server or user API, which processes the data, and generates an authentication code where the wireless identification device output data corresponds with authentication criteria.

20 Claims, 3 Drawing Sheets

(51) Int. Cl.
    *H04W 12/08*    (2021.01)
    *G06K 19/04*    (2006.01)
    *H04W 12/04*    (2021.01)
    *H04W 12/06*    (2021.01)
    *H04W 12/63*    (2021.01)
(52) U.S. Cl.
    CPC .......... *H04W 12/08* (2013.01); *G06Q 10/083* (2013.01); *H04W 12/04* (2013.01); *H04W 12/06* (2013.01); *H04W 12/63* (2021.01)

(56) References Cited

U.S. PATENT DOCUMENTS

| | | | | |
|---|---|---|---|---|
| 6,285,295 B1* | 9/2001 | Casden | G06K 19/0723 | 340/12.51 |
| 6,718,319 B1* | 4/2004 | Fisher, Jr. | G06Q 20/3552 | |
| 7,845,553 B2* | 12/2010 | Holz | G06K 7/10346 | 235/487 |
| 9,878,167 B1* | 1/2018 | He | A61B 5/6868 | |
| 2002/0085230 A1* | 7/2002 | Kitahara | G06F 3/122 | 358/1.16 |
| 2002/0091880 A1* | 7/2002 | Hamann | G06F 21/604 | 710/1 |
| 2002/0156677 A1* | 10/2002 | Peters | G06Q 30/02 | 705/14.64 |
| 2003/0108202 A1* | 6/2003 | Clapper | H04L 9/0872 | 380/258 |
| 2003/0156026 A1* | 8/2003 | Eagleson | G06K 17/0022 | 340/505 |
| 2003/0204711 A1* | 10/2003 | Guess | G06F 9/44505 | 713/1 |
| 2003/0231334 A1* | 12/2003 | Nagai | H04N 5/913 | 358/1.14 |
| 2004/0097252 A1* | 5/2004 | Hethuin | H04W 8/26 | 455/518 |
| 2004/0210656 A1* | 10/2004 | Beck | H04L 29/06 | 709/225 |
| 2004/0215963 A1* | 10/2004 | Kaplan | G07F 7/122 | 713/172 |
| 2004/0229560 A1* | 11/2004 | Maloney | G07C 9/28 | 455/3.01 |
| 2005/0059339 A1* | 3/2005 | Honda | G07G 1/0045 | 455/3.01 |
| 2005/0280511 A1* | 12/2005 | Yokoyama | G06K 19/0723 | 340/10.5 |
| 2006/0180666 A1* | 8/2006 | Yamashita | G06K 7/10039 | 235/451 |
| 2006/0238305 A1* | 10/2006 | Loving | G06K 7/0008 | 340/10.3 |
| 2006/0279401 A1* | 12/2006 | Yoshii | B60R 25/24 | 340/5.72 |
| 2007/0055470 A1* | 3/2007 | Pietrzyk | G05B 19/05 | 702/104 |
| 2007/0109100 A1* | 5/2007 | Jett | H04L 12/189 | 340/9.1 |
| 2007/0120647 A1* | 5/2007 | Min | H04L 61/30 | 340/572.1 |
| 2007/0208832 A1* | 9/2007 | Traub | H04L 67/34 | 340/572.1 |
| 2008/0104010 A1* | 5/2008 | Subramanian | G06K 7/0095 | |
| 2008/0120710 A1* | 5/2008 | Holz | G06Q 10/08 | 726/7 |
| 2008/0271115 A1* | 10/2008 | Maubach | H04L 9/3026 | 726/2 |
| 2009/0096585 A1* | 4/2009 | Herrod | G06K 17/00 | 340/10.2 |
| 2009/0172384 A1* | 7/2009 | Anson | G06F 9/44505 | 713/100 |
| 2010/0034375 A1* | 2/2010 | Davis | H04L 9/16 | 380/42 |
| 2010/0079254 A1* | 4/2010 | Koo | G06F 8/65 | 340/10.3 |
| 2011/0016318 A1* | 1/2011 | Syngkon | H04L 9/3247 | 340/572.1 |
| 2011/0148570 A1* | 6/2011 | Weidinger | G06K 7/10366 | 340/10.51 |
| 2012/0077468 A1* | 3/2012 | Fan | G07C 9/00309 | 70/91 |
| 2012/0203465 A1* | 8/2012 | Callewaert | G01N 33/6893 | 702/19 |
| 2012/0212323 A1* | 8/2012 | Skaaksrud | G06Q 10/08355 | 340/5.74 |
| 2012/0245447 A1* | 9/2012 | Karan | G16H 40/63 | 600/365 |
| 2013/0210360 A1* | 8/2013 | Ljung | H04B 7/24 | 455/41.2 |
| 2013/0222107 A1* | 8/2013 | Herscovitch | H04L 63/0428 | 340/5.6 |
| 2013/0305035 A1* | 11/2013 | Lyne | G06Q 30/06 | 713/150 |
| 2014/0089390 A1* | 3/2014 | Chandra | G06Q 10/103 | 709/203 |
| 2014/0266627 A1* | 9/2014 | Padilla | G06K 7/0008 | 340/10.1 |
| 2014/0356819 A1* | 12/2014 | Rodriguez Regalado | G09B 21/004 | 434/114 |
| 2015/0293770 A1* | 10/2015 | Orii | G06F 11/004 | 710/9 |
| 2016/0292471 A1* | 10/2016 | Lampe | G06K 7/10217 | |
| 2016/0321477 A1* | 11/2016 | Reffe | G06F 16/955 | |
| 2017/0178433 A1* | 6/2017 | Selinder | G07C 9/00817 | |
| 2017/0285974 A1* | 10/2017 | Patock, Sr. | G06F 3/0671 | |
| 2018/0121903 A1* | 5/2018 | Al Salah | G06Q 20/24 | |
| 2018/0157944 A1* | 6/2018 | Ashwin | G06Q 10/08 | |
| 2018/0182233 A1* | 6/2018 | Skarda | G08B 29/22 | |

\* cited by examiner

METHOD AND APPARATUS FOR SELECTING A WIRELESS READER ACTION AS A RESULT OF AN OUTPUT DATA RECEIVED FROM A WIRELESS IDENTIFICATION DEVICE

The present invention relates to a wireless reader that receives its instruction set from a user presentable encrypted output data string of a transmitter or transceiver device referred to as a Wireless Identification Device. The transmitted data will in turn instruct the reader via its data string to perform a series of commands and/or actions.

BACKGROUND

Identification and monitoring of people, animals and/or things are not new but increasingly common with the advent of what is commonly called the Internet of Things. The emphasis is to connect everything in one or another form to the internet or similar online application and/or service directly and/or indirectly.

The technology to wirelessly achieve this has been in existence for several years but is only used in specific applications pockets rather than in large solutions across multiple applications due to the limitations in the capabilities of the current wireless transmission technology, including RFID, Bluetooth and the like. The prior art limitations relevant to the invention can be described as follows:

a) The prior art wireless electronic identification is read via a wireless handheld reader or fixed reader that transfers the identification and other data via a communication network to a specific data destination on the network or internet. The address and the format is determined by the reader configuration and the data destination is specific to an application database or data set that might be shared between more than one applications. The same electronic identification can be used across organisational boundaries but when read by different reader infrastructure it results in one object having one electronic identification with duplicated descriptive and demographic data in various databases and/or applications. Alternatively more than one prior art electronic identification is attached to the object for different applications. By example, with personal identification, an individual has a number of different forms of electronic identification namely, different electronic identifications for every bank product, loyalty program and location they need to access to mention but a few. Some of these identifications are used by more than one application. Both scenarios lead to data duplication with a perceived ownership of the data collected about the individual in this case.

b) Prior art wireless devices are easy to duplicate or emulate. Various enhancements exist to secure these devices but this is only marginally effective and does not prevent duplication, thereby having significant security ramifications.

c) Total reliance on the application it is connected to validate identity of the prior art electronic identification.

d) Low intelligence on the monitoring device that requires the data to be transmitted to the application on the internet on an ongoing basis instead of only on specific events or regular time intervals.

e) Privacy resulting from data monitoring by multiple data recipients, whereby the subject of the confidential data does not have control over data disclosure.

f) Because of the above, prior art wireless identification devices are not suitable to be deployed in highly secure applications where security and privacy is required and thus not suitable to be used as single identification device of people and objects.

Connecting everything to the internet has advantages that will in future change the way businesses do business. Smart, connected products offer exponentially expanding opportunities for businesses to change the way they service their clients. Wireless identification technology offers an ideal way to identify products everywhere and to transmit data about the product use and performance to a central server. This however is not possible unless the product is monitored with a device which is able to overcome the above mentioned limitations.

Of particular relevance in the above to the invention is that current electronic identification systems pre-configure the reader with variable settings relevant to the application. These settings include a data destination or address to where the data should be transferred. This results in the reader infrastructure being linked to specific applications. Readers that detect any other foreign wireless identification devices that is not known to the specific application are ignored.

Because readers and the data received are linked to specific applications, it is very difficult to monitor objects across an entire value chain. Using a single electronic identification across multiple applications is impossible without duplication of data in multiple applications.

Pre-configured readers are also not suitable to be incorporated into electronic devices, network devices and/or telecommunication products due to the fact that these readers only work with one application or dataset.

Current radio frequency technology encrypts and decrypts the data using a standard encryption method from the reader to the database. This encryption is not unique per wireless identification transmitter and thus not secure.

Data owners with prior art technology have no control over the data and who sees what. In general the entity that reads the wireless communication identification owns the data.

Adapting the prior art to distribute the data to where ever required would create the need for an undesirably large infrastructure to cope with the data inflow and distribution, thereby rendering the use of such wireless communication technologies impractical.

Accordingly, it would be advantageous to identify and monitor objects where ever there is a compatible reader; to enable the reader through the instruction set received to behave differently for different applications; and to transmit the data to the data destination or address as per the wireless identification device's instruction set. It would be particularly advantageous where the data transmitted from a wireless identification device which is associated with and accordingly identifies a person or object and significant information pertaining to the instruction set is encrypted to avoid unauthorised third party use of the data. Obtaining this instruction set from the wireless identification device will ameliorate the disadvantages associated with the prior art as discussed above.

In the invention the term wireless identification device includes a device which is enabled to transmit data actively or passively through any one of a wireless communication protocol or by fixed cable. The wireless identification device may in addition broadcast data.

The invention seeks to provide a method and apparatus for selecting a wireless reader action as a result of uniquely encrypted output data received from a wireless identification device that at least partially ameliorates the abovementioned disadvantages associated with the prior art.

SUMMARY OF INVENTION

According to the invention there is provided a method for selecting a wireless reader action comprising the steps of
- an wireless identification device being an electronic identification and transmitting output data;
- the wireless reader receiving the output data, wherein the output data comprises an instruction set how to process the data and where to transfer the output data to; and
- the wireless reader processing the output data and performing a suitable action in compliance with said output data instructions.

Conveniently the instruction set is configured and stored on the wireless identification device, the instruction set comprising at least one of:
- a data destination to where the wireless reader data needs to transfer data processed from the electronic device, hereafter referred to as a data address, in order to directly or indirectly update or query the said data address. The data addresses includes an IP address, IPv6 address, MAC Address, or an equivalent address format that will identify a specific device or virtual address where data can be transferred to on the Internet;
- GPS co-ordinates related to a specific location;
- identification information pertaining to an individual or object identified, including a national identification number, passport number and social security number in the case of an individual or serial number in the case of objects;
- notification information to be transmitted, including the recipient details and type of method and information to transmitted, by example transmitting the time and location of the wireless identification device by sms to a cell phone number;
- a variable encryption key unique to the specific wireless identification device;
- output data variables that will be processed by the wireless reader enabling the wireless reader to perform various functions; and
- output data variables that relate to security and privacy settings pertaining of the data stored on the electronic device. The method thereby providing configurability, personalisation, security and privacy of data.

Conveniently the electronic identification includes active and passive RFID technology and or other related technologies including wireless identification device technology or wireless sensor technology where the wireless identification device is combined with sensor data, static data and/or serial input data from another device.

Conveniently the electronic identification comprises at least one input data device for inputting data. Such input data devices may include sensors and serial inputs.

Conveniently the input data is processed in combination with the output data instruction set, whereby input data is transmissible to a chosen data address comprising relevant identification information.

Conveniently the electronic identification comprises electrically erasable programmable read-only memory. Said memory is used for specific applications where additional reader instructions and data are required locally.

The wireless reader is thereby enabled to perform the instructions set without needing to obtain additional data or instructions via a connection to a communication network. With communication network servers and core data processing becoming increasingly burdened due to increased data volumes processed, the processing of instruction data will be more efficient relative to communication network dependent reader devices.

Conveniently the electronic identification operates as a location identification device where placed permanently at specific locations. A wireless reader proximal to this device will consequently obtain an instruction set from said device relevant to the environment, physical location and application required. Accordingly, the wireless readers do not require any configuration and can simply execute the instruction set received from the wireless identification device. Readers are thereby suited for placement in other electronic devices as an OEM (Original equipment manufacturer) device as well as in public and/or private locations. By example, the wireless identification device's instruction set may require its physical presentation to the wireless reader, whereafter a physical presentation dependant instruction is processed. The wireless reader is thereby enabled to perform multiple actions by the electronic identification. Similarly, the instruction set will cause the wireless reader via its output ports, to enable or disable devices connected to the ports. Accordingly, network infrastructure is reduced due the invention's ability to create or cause an action directly between the wireless identification device and the reader. As such certain actions are enabled in the absence of the wireless reader connected to a network.

Conveniently the wireless readers are enabled to perform multiple functions within a location where a plurality of electronic devices are present. Similarly, output data from multiple electronic devices can combine to act as a group, whereby the group results in the reader performing a series of group dependant commands and/or actions.

Conveniently the wireless identification device can comprise a unique data address.

Preferably the wireless identification device comprises a unique variable encryption key, which is transmitted as part of the instruction set. Data on the data address to where the destination is linked is thereby secured. In use, the electronic identification will have to be present to decrypt the data when permission to view the data is granted.

Conveniently the unique variable encryption key is determined by at least one of wireless identification device's age which increases based on date of creation and number of data transmissions, temperature, date, location, altitude, pressure, and the variation of the aforementioned features.

Conveniently, the unique variable encryption key criteria are programmable and data associated therewith is allocated non-sequentially and more specifically shuffled into a pre-set format determined by the user of the programming device so as to move the data into a unique pattern and combination only known by the programmer device. This in turn creating the decryption key.

Accordingly, an unauthorised third party interception of the data transmitted would not disclose significant details of the wireless reader or the wireless identification device as data decryption would be required prior to said disclosure. Similarly, duplication of transmission patterns would not enable cloning of the wireless identification device as the encryption key is continually varying.

Conveniently authentication of data and resulting permission to decrypt the wireless identification device output data is transmitted to an authentication server and or a user application program, which is enabled to process the data, generate an authentication code where wireless identification device output data corresponds with authentication criteria.

Conveniently prior to generating the authentication code, the authentication server transmits a verification request to an authorised wireless identification device user. The user provides verification, which is then communicated to the server using a suitably enable communication device. The verification includes at least one of biometric input, keyboard input, kinetic input, visual input and audio input, the aforementioned recorded on the authentication server for verification of the wireless identification device.

Conveniently the authentication server is enabled to transmit alert notifications of wireless identification device and specific wireless reader interactions to a predetermined location, including at least one of an email address, cellular number, computing device.

Conveniently the authentication server is enabled to transmit varying alert notifications in accordance with the wireless identification device status reflected on the server. By example, a wireless identification device with a status changed to "stolen" would transmit the date and location of the reader to a location recorded on the server as responsible for "stolen" status alerts. In use, this alert may be transmitted to police or security services and result in real-time alert notifications.

Conveniently the electronic device may be remotely programmed, thereby enabling its functionality to be enabled, disabled or revised.

Conveniently remote programming of the electronic device is effected when data transferred to the data address is processed by a remote server in accordance with desired functional parameters and returned as input data to the electronic device, where after the electronic device is reprogrammed.

Conveniently the wireless reader is enabled to:
function independently executing the instruction set obtained from one or more electronic identifications such as unlocking a door when in close range;
function as a private or public reader for receiving instructions sets from multiple electronic identifications such as transferring the identity and relevant monitoring data to the specified data address;
perform specific functions in an application where the reader obtains an instruction set from an environment identification location device and from one or more electronic identifications. In particular, whereby part of the instruction is to obtain further instructions from the electrically erasable programmable read-only memory on the identification device such as biometric data to verify the identification of the bearer of the electronic identification before performing a function such as opening an electronic gate.

Preferably the data address on the electronic identification enables a unique data address per electronic identification. The instruction set can instruct the wireless reader to transfer the data to a gateway or switch, with an address optionally configured on the wireless reader, from where the data will then be transferred to the data address provided by the electronic identification.

Preferably, the wireless identification device output data transmitted is encrypted, whereby the wireless reader requires said data to be authenticated prior to decryption and disclosure of the decrypted data, alternately prior to disclosure of the wireless reader identification.

Conveniently the output data comprises encrypted and non-encrypted data, whereby the non-encrypted data provides wireless reader instructions for transmitting and authenticating encrypted data, where after the data is decrypted upon successful authentication and the decrypted instruction set processed by the wireless reader.

According to another aspect of the invention there is provided a wireless identification device comprising programmable output data, wherein the output data comprises an instruction set, which when processed by a wireless reader, determines how the wireless reader processes the output data.

Conveniently the wireless identification device comprises an instruction set, configured and stored on the wireless identification device, the instruction set comprising at least one of:
a data address, being a destination to where the wireless reader data needs to transfer data processed from the electronic device, for communication with said data address, whereby the data addresses includes an IP address, IPv6 address, MAC Address, or an equivalent address format that will identify a specific device or virtual address where data can be transferred to on the Internet;
GPS co-ordinates related to a specific location;
identification information pertaining to an individual or object identified, including a national identification number, passport number and social security number in the case of an individual or serial number in the case of objects;
notification information to be transmitted;
a unique variable encryption key to the specific wireless identification device;
output data variables that will be processed by the wireless reader enabling the wireless reader to perform various functions;
output data variables that relate to security and privacy settings pertaining of the data stored on the electronic device.

Preferably the wireless identification device includes at least one of active and passive RFID and where the RFID is combined with at least one input data device for inputting data.

Preferably the wireless identification device comprises electrically erasable programmable read-only memory, and said memory is allocated to specific applications where additional reader instructions and data are required locally.

Preferably the wireless identification device comprises at least one of a unique data address and a unique variable encryption key, which is transmissible as part of the instruction set.

The term radio frequency identification (RFID), radio frequency transmitter and radio frequency is not limited to radio frequency identification or transmission protocols, as the case may be, rather is more broadly defined in terms of the scope of the invention, as applying to any near field communication protocol or combination thereof that enables functionality as claimed by the invention.

Further features, variants and/or advantages of the invention will emerge from the following non-limiting description of an example of the invention made with reference to the accompanying drawings.

DETAILED DESCRIPTION OF THE INVENTION

Figure 1:
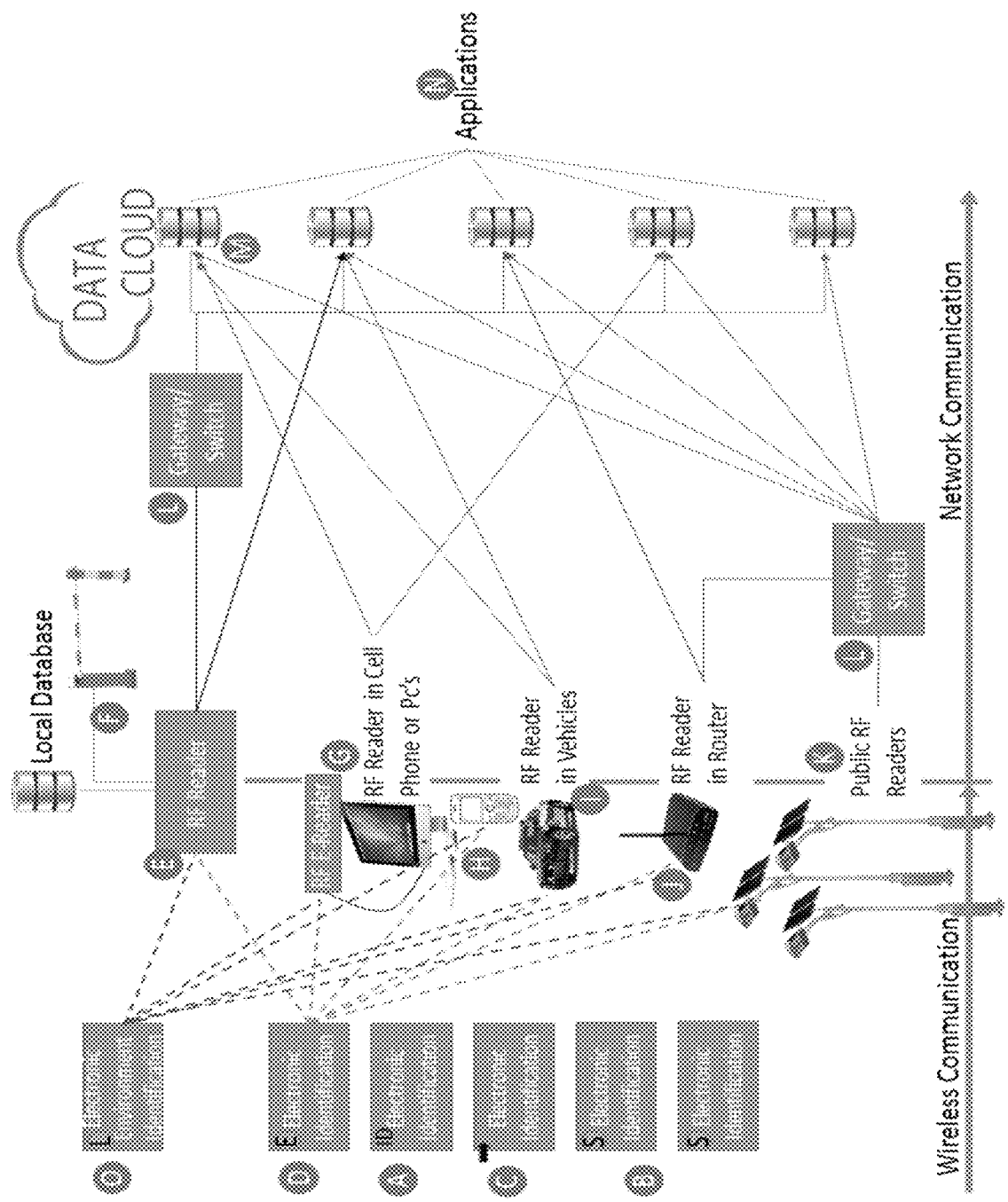
FIG. 1 shows a schematic view of a method for selecting a RFID reader action of the invention.

In the drawings there is shown a method for selecting a RFID reader action in accordance with the invention. FIG. 1 illustrates a RFID reader (E, G, H, I, K), which is totally independent of any application. The reader is configured with a default configuration but the instructions how to process each reading is received directly from an electronic identification, in the form of a RFID tag, at time of reading said electronic identification. The RFID reader process instructions are delivered by an instruction set which forms part of an output data string of the electronic identification (A, B, C & D). The output string comprises an ID and monitoring data of the electronic identification as well as variable values that will instruct the reader how to process the data it receives from the wireless identification device. The wireless identification device in return is programmed with variable data that will transmit under certain given conditions. By example, it is possible to select a different data address for every sensor alarm. Further it is also possible to trigger a specific RFID reader.

The electronic identification is configured either during its manufacture or subsequent thereto and comprises at least one of the following output data:
  data address to where the data needs to be transferred to in order to directly or indirectly update or query the said data address. The data address being an IP address, IPv6 address, MAC Address, or an equivalent address format that will identify a specific device or virtual address where data can be transferred to the Internet;
  GPS co-ordinates related to a specific location;
  identification information pertaining to an individual or object identified, such as a national identification number, passport number and social security number in the case of and individual or serial number in the case of objects;
  notification information such as a cell phone number or email address;
  variable encryption key unique to the specific wireless identification device;
  variables that will be interpreted by the reader enabling same to perform various functions;
  variables that relates to security and privacy. The aforementioned output data thereby facilitates configurability, personalisation, security and privacy of the invention.

The instruction set will not necessarily transmit all the data with every transmission, rather the embedded logic of the electronic identification will determine what data to transmit according to the rules of the electronic identification. By example, the electronic identification can transmit the default data address every time the device communicates but a different data address will be used under alarm conditions.

The electronic identification for the purposes of this invention includes the use of active and passive RFID (A,B) technology and related technologies where the RFID is combined with sensor data (B), static data and/or serial input data from another device (C).

The invention allows for sensors or other serial inputs on the wireless identification device to input data on to the electronic identification. This input data is combined with the instruction set from the wireless identification device, in order that when processed, will ensure that the input data is transmitted to the chosen data address with relevant identification information.

In one application of the invention, the wireless identification devices (C) in its simplest form can transmit error codes received from a processor of a washing machine via an electronic identification. In such case, the manufacturer of the machine who understandably wants to enhance its service to clients may proactively contact the machine operator to offer a repair service for the washing machine. It is thus of great benefit to the manufacturer where the error code data is transferred to the manufacturer's data address. The prior art required the manufacturer to be in control of the reader or use a monitoring device on the washing machine that uses GSM, WiFi or Bluetooth. All three these options come with complications and in the case of WiFi and Bluetooth might require a local application on a computer, tablet or smart phone to facilitate the monitoring.

Additionally, sensor elements can be attached (B) to the electronic identification that monitor a variety of elements. By example, these sensors can monitor movement, temperature and tilt. The input data can be used to trigger certain local logic on the identification device. This in turn will impact the instruction set transmitted to the reader and thus cause certain defined actions.

The electronic identification would optionally be equipped with Electrically Erasable Programmable Read-Only Memory (EEPROM) (D). This memory is used for specific applications where additional reader instructions and data are required locally. The aim of this is to enable the RFID reader (G) to perform the instructions set without needing to obtain additional data or instructions via a connection to a communication network.

In another application of the invention, the electronic identification (A) can be used to verify the carrier of the electronic identification using biometrics such as a finger print. The reader will obtain an instruction from the electronic environment identification (O) to request additional verification data from a specific register on the EEPROM. The reader (G) will on successful verification of the data perform an action. By example, the data to obtain full verification was obtained locally without requesting data from the data cloud (M). Once verification has been completed the data will be transferred according to the instruction set to the specified data address. The electronic identification will when so configured perform the purpose of an electronic environment identification device (O) placed permanently at specific locations. Any RFID reader in the presence of this device will obtain additional instructions from this device related to the environment, physical location and application. The electronic environment identification device (O) adds to the instruction set, instructions specific to the location, environment and application. This device can for instance provide the GPS location that will identify the reader, application specific settings that will instruct the reader to perform additional functions for the specific application. The electronic environment identification device (O) provides the reader with a configuration. Should there be a requirement to replace the reader it will automatically obtain its instructions from the electronic environment identification device (O). Mobile readers (H, I) as found in cell phones and vehicles, can obtain different configurations as required. The mobile device associated with an emergency vehicle can have its own electronic environment identification device (O). More than one electronic environment identification devices may impact the reader.

The readers may thus be standardized as they do not require any configuration and can simply execute the instruction set received from the wireless identification device. This makes the readers ideal to be placed in other electronic devices as an OEM (Original Equipment Manufacturer) device as well as in public and/or private installed locations.

The reader will if so instructed by the electronic environment identification, require the wireless identification device to be physically presented. The reader will obtain additional instructions with data from the Electrically Erasable Programmable Read-Only Memory from the electronic identification. In so doing, further customisation of the reader's actions is possible, where such actions are application specific, yet without preventing the same reader performing other actions when instructed by the electronic identification to do so.

The readers will through its output ports, enable or disable devices connected to said ports in accordance with the instruction set of the wireless identification device.

Figure 2:
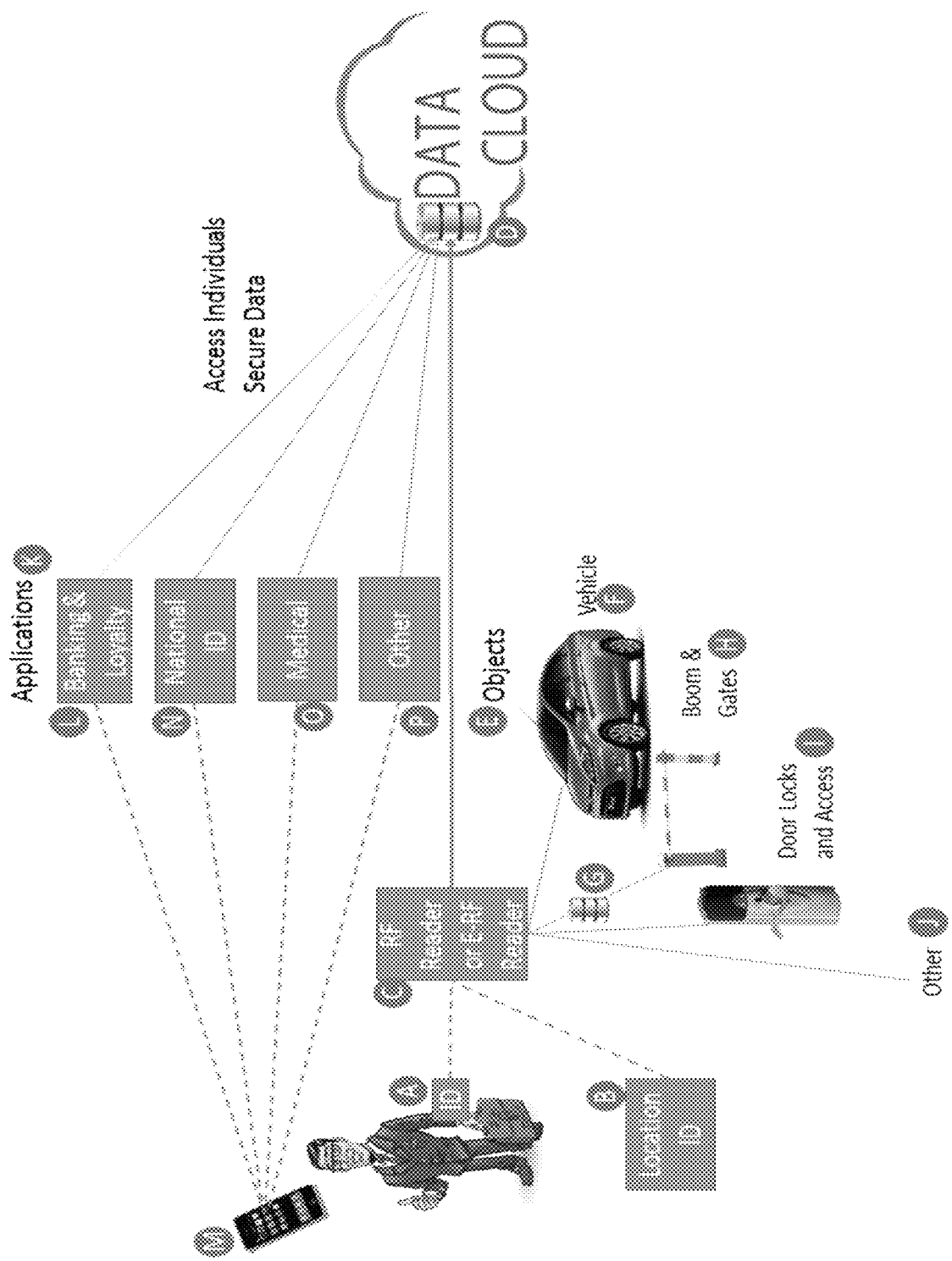
FIG. 2 shows a schematic view of the method for selecting a RFID reader action of the invention pertaining to single identification for people across multiple applications.

The RFID reader is consequently enabled to:
function independently executing the instruction set obtained from one or more electronic identifications such as unlocking a door when in close range;
function as a private or public reader for receiving instructions sets from multiple electronic identifications such as transferring the identity and relevant monitoring data to the specified data address;
perform specific functions in an application where the reader obtains an instruction set from an environment identification location device and from one or more electronic identifications. In particular, whereby part of the instruction is to obtain further instructions from the electrically erasable programmable read-only memory on the identification device such as biometric data to verify the identification of the bearer of the electronic identification before performing a function such as opening an electronic gate.
Additionally, the data address on the electronic identification enables a unique data address per electronic identification. The instruction set can instruct the RFID reader to transfer the data to a gateway or switch, with an address optionally configured on the RFID reader, from where the data will then be transferred to the data address provided by the electronic identification.
Each electronic identification comprises a unique data address. A variable encryption key unique to every identification device is transmitted as part of the instruction set of the wireless identification device, thereby enabling protection of the data on the data address where the destination is linked to one electronic identification. In use, the electronic identification will have to be present to decrypt the data upon permission to view the data being granted.
The invention in the case of personal identification enables an individual's data to be stored in one location from where it can be managed as illustrated by FIG. 2.

As will be appreciated, the invention allows for a vast reduction in network infrastructure due to its ability to create or cause an action directly between the wireless identification device and the reader. This also enables certain actions to take place where there is no network connection present.

Readers are thus enabled to perform different functions within a location where there is more than one identification device present. A plurality of identification devices can act as a group and the group can cause the reader to perform a series of commands and/or actions.

In another application of the invention, in accordance with FIG. 1, any reader (E, G, H, I, J, K) has the ability to read any electronic identification (A, B, C, D, O) and transfer the data as per the instruction set claim to the predefined data address as obtained from the instruction set on the data cloud (M) from where the data can be used by a number of applications (N). The electronic identifications (A, B, C, D, O) can be read by reader (E). This reader also has a local function and obtain the instruction set from the electronic environment identification (O). The reader (E) will not only read the electronic identification and execute the instruction set but also use the identification to determine if the traffic boom (F) can be opened when the electronic identification comes with a suitable proximity.

In another application of the invention, in accordance with FIG. 2, the invention enables the use of a single electronic identification to identify individuals for the purposes of all applications. The electronic identification with the additional EEPROM (FIG. 2 A) provides a totally secure identification to an individual or object.

The electronic environment identification (FIG. 2 B) provides every reader with the application specific configuration required to perform various functions. The reader can be used in objects or in local applications where the identification will be verified on a local level against settings obtained from the electronic environment identification (FIG. 2 B) or a local database (FIG. 2 G). The individual electronic identification can be used to identify the individual to objects (FIG. 2 E). Objects can be vehicles, doors and locks, booms and gates and any other object (FIG. 2 F, H, I, J) that are equipped with the readers. This replaces multiple access cards and keys as the individual will be able to be wirelessly identified to objects. The reader is thus ideal to be placed in other electronic devices as an OEM (Original equipment manufacturer) device.

Similarly, the same individual electronic identification can be used in banking and loyalty applications (FIG. 2 L), for national identification (FIG. 2 N), for medical identification (FIG. 2 O) and various other applications that require identification. Once the individual is identified and the identification is verified, if necessary a mobile application (FIG. 2 M) can be triggered that will allow the individual to transact and provide authentication of requests.

This invention enables system designers to locate individual data in one location. The individual can give access to segments of the data depending on the environment identification device present (FIG. 2 B) with the individual identification (FIG. 2 A). By example, medical data becomes available when the individual identification is seen with the electronic environment identification that indicates that when the individual is in a hospital. The data in this personal data location can be totally secure with the unique variable encryption key that is part of the instruction set. This functionality can be further enhanced by combining it with information that resides on the EEPROM.

The electronic environment identification device with the individual electronic identification is ideal to be used with multiple readers in objects and across multiple applications creating a single identification.

Figure 3:
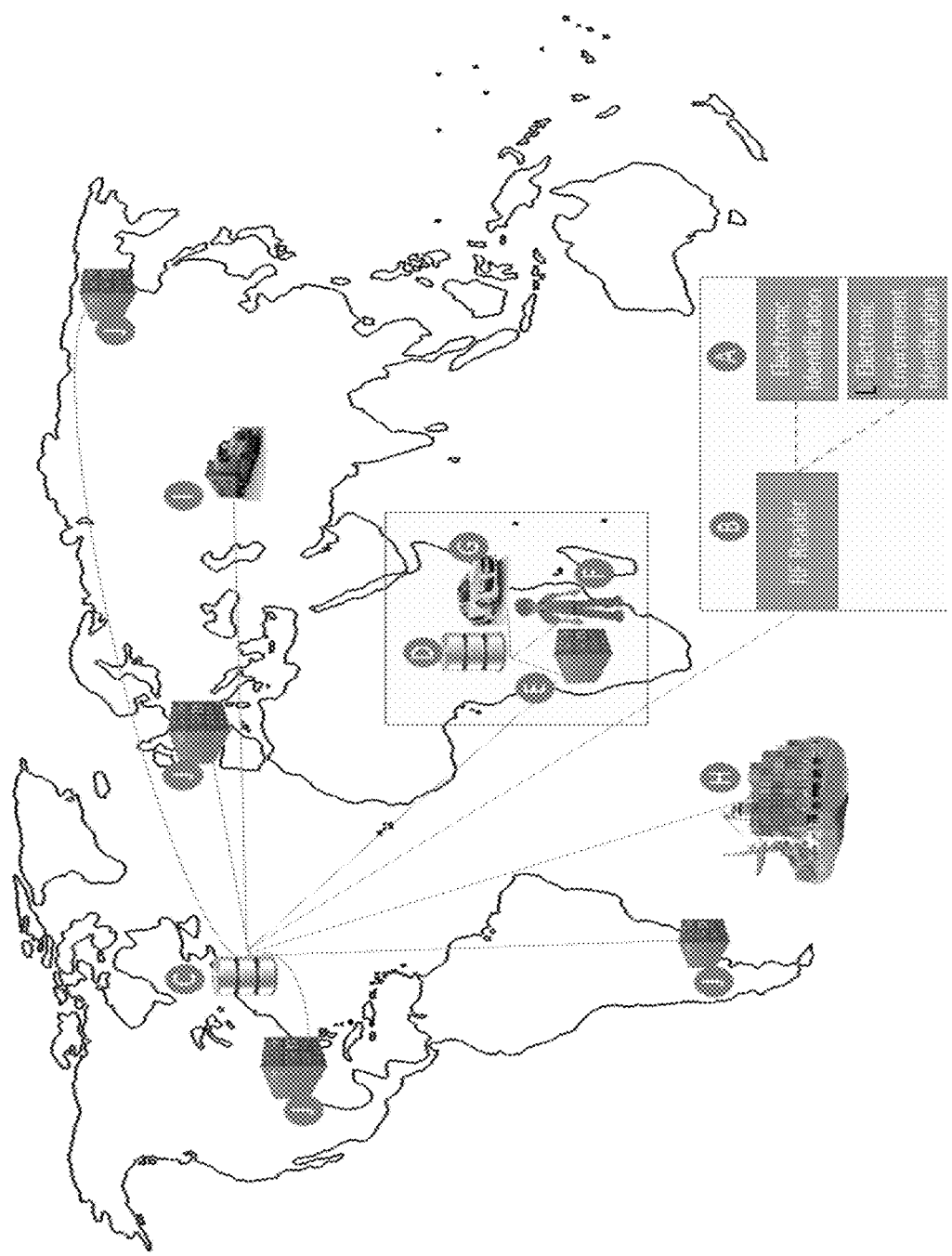
FIG. 3 shows a schematic view of the method for selecting a RFID reader action of the invention pertaining to single identification for shipping containers across multiple applications.

In another application of the invention, in accordance with FIG. 3, enables the tracking of assets across multiple organisational and national boundaries. By example, when used for container management and tracking. The invention can be used locally in ports, container yards and by logistics companies where the reader and the electronic environment identification (FIG. 3 B) are repeated in every installation globally. This enables these different environments to track people, vehicles, assets and shipments for their own local purposes (FIG. 3 F, G, D) while updating through the reader infrastructure a central container database with global container movements (FIG. 3 C). The containers can be tracked when on open sea (FIG. 3 H) or in container yards (FIG. 3 J). The containers can also be tracked while transported by rail or road (FIG. 3 I) where a reader is be equipped with GPS to track location in real-time.

The central container database (FIG. 3 C) allows for any authorized individual in the value chain to find the container whereabouts and whether in use. The container electronic identification can also be equipped with movement sensors and anti-tamper sensors that will allow the logistics partners to monitor not only the container but also to ensure that the container is not tampered with. Where tampering results in an alarm condition, an alarm condition may be transmitted to a suitable security service provider and container owner informing them of such condition. The service provider may thereby respond timeously to apprehend the person responsible for the tampering.

The container database (FIG. 3 C) will also update wherever the container is seen by a public reader next to motorways, intersections and parking areas. The invention enables the collection of data in a central database even though the assets in this case containers are in use by thousands of logistic partners globally. The prior art does not make provision for solutions of this magnitude or aim to integrate data across multiple applications and databases. The invention allows for total connectivity of objects, people and devices to the Internet.

The method and apparatus of the invention is thus ideally suited to be used as a single secure identification for identifying people, objects and animals in all applications requiring unique identification.

The summary of invention and claims form an integral aspect of the description of the invention.

The invention claimed is:

1. A method for selecting a wireless reader action comprising the steps of
   a wireless identification device transmitting output data through at least one communication protocol,
   wherein the output data comprises a reader instruction set on how to process the output data, identification data, wireless identity device data, notification data, security data and at least one data address;
   the wireless reader receiving the output data from at least one wireless identification device;
   the wireless reader processes the output data in compliance with said output data reader instruction set and consequently selectively performs at least one action selected from a group including:
      combining the instructions with other wireless identification device instructions for execution;
      obtaining additional input data from the memory of the wireless identification device or data address;
      executing application specific actions;
      updating the configuration of the wireless identification device;
      processing at least one output data string and transmit the data to at least one data address on the local network or Internet.

2. The method for selecting a wireless reader action as claimed in claim 1, wherein the reader receives data through its receiver, alternately transceiver, through at least one communication protocol, from the wireless identification device; and depending on the reader {instruction set wirelessly transmits data to the wireless identification device through a matching communication protocol.

3. The method for selecting a wireless reader action as claimed in claim 1, wherein the reader receives instructions from the wireless identification device or from a specific memory address on the wireless identification device that is executed on the wireless reader comprising:
   parameters in the form of output data variables that instruct the reader to perform predefined reader actions;
   specific application-related reader instructions;
   data variables that relate to security and privacy settings concerning the data stored on the electronic device.

4. The method for selecting a wireless reader action as claimed in claim 1, wherein the reader receives identification data from the wireless identification device that is inputted in the execution of reader instruction set wherein the identification data comprising at least one of:
   a unique identification number;
   identification type;
   additional data distinctive to the identity of a person, object, animal or location;
   a unique variable encryption key associated with the identity holder data; and
   unique variable encryption key criteria.

5. The method for selecting a wireless reader action as claimed in claim 1, wherein the reader receives wireless identification data from the wireless identification device that is input in the execution of reader instructions wherein the wireless identification data comprise at least one of the following:
   sensor data; and
   serial input data from another connected device.

6. The method for selecting a wireless reader action as claimed in claim 1, wherein the reader receives at least one data address from a wireless identification device that the reader includes in the output string it configures when executing the reader instruction set wherein the reader:
   obtains additional input data from a data address; or
   transmits output data to the data address.

7. The method for selecting a wireless reader action as claimed in claim 1 wherein the wireless reader combines the instructions of wireless identification devices for execution when such instruction is included in the reader instructions received from a wireless identification device.

8. The method for selecting a wireless reader action as claimed in claim 1, wherein the wireless reader obtains additional input data to execute the reader instructions from a memory address on the wireless identification device or by querying a data address provided by one of the wireless identification devices.

9. The method for selecting a wireless reader action as claimed in claim 1, wherein the wireless reader is enabled to execute application specific actions that include at least one of the following:
   activating a port on the reader to enable and instruct an electronic device; —requesting additional input data through a serial input device including any one of a keypad, biometric device, camera or scanner;
   requesting the wireless identification device to be presented to the reader for further interrogation.

10. The method for selecting a wireless reader action as claimed in claim 1, wherein the wireless reader updates the configuration of the wireless identification device according to the reader instructions with at least one of the following:

data obtained from at least one data address; and—data obtained through local reader actions.

11. The method for selecting a wireless reader action as claimed in claim 1, wherein the wireless reader processes at least one output data string from:
   the output data from at least one wireless identification device;
   additional data obtained by the wireless reader locally;
   data processed and formatted by the reader according to the instructions obtained from at least one wireless identification device; and
   transmits the data string to at least one data address.

12. The method for selecting a wireless reader action as claimed in claim 4, wherein the reader uses the output data encryption key criteria to allocated data non-sequentially, more specifically shuffled into a pre-set format, when the reader output data string.

13. A programmable wireless identification device, the device configured to transmit dynamically compiled output data through at least one communication protocol, wherein the output data comprises a reader instruction set configured to instruct a reader how to process the output data, identification data, wireless identity device data, notification data, security data and at least one data address and consequently selectively perform at least one action selected from a group of actions including:
   combining the instructions with other wireless identification device instructions for execution;
   obtaining additional input data from the memory of the wireless identification device or data address;
   executing application specific actions;
   updating the configuration of the wireless identification device;
   processing at least one output data string and transmit the data to at least one data address on the local network or Internet.

14. The wireless identification device, as claimed in claim 13, wherein the wireless identification device is enabled to transmit data through its transmitter, alternately transceiver, through at least one communication protocol, to the wireless identification device; and is further enabled to receive configuration data wirelessly from the wireless reader through matching communication protocols.

15. The wireless identification device, as claimed in claim 13, having the reader instruction set stored on the wireless identification device when the device is configured and comprising:
   parameters that instruct the reader to perform predefined reader actions;
   specific application-related reader instructions; and
   data variables that relate to security and privacy settings concerning the data stored on the wireless identification device.

16. The wireless identification device, as claimed in claim 13, wherein the identification data is compiled from:
   data added during the configuration of the wireless identification device; —data obtained from the hardware components on the device; and
stored in the memory of the wireless identification device comprising at least one of:
   a unique identification number and type of identification;
   additional data distinctive to the identity of a physical object or location; and
   a unique variable encryption key.

17. The wireless identification device, as claimed in claim 13, wherein the wireless identification data associated the wireless identification device is comprised of at least one of the following:
   sensor data; and—serial output data from another device.

18. The wireless identification device, as claimed in claim 13, wherein the wireless identification device has notification instructions comprising:
   recipient details;
   message type;
   transmission method; and
   information to transmit.

19. The wireless identification device, as claimed in claim 13, wherein the wireless identification device has at least one data address stored in an address format that will identify a specific device or virtual address on the local network or Internet and wherein the data address provides a data address:
   where the wireless reader can obtain additional input data; or—transmit output data to the data address.

20. The wireless identification device, as claimed in claim 13, wherein the wireless identification device is enabled to employ and communicate through multiple communication protocols simultaneously.

* * * * *